Dec. 9, 1930.  R. T. OSMAN  1,784,464
VEHICLE DUMP BODY
Filed Nov. 8, 1928   2 Sheets-Sheet 1

Inventor:
Ralph T. Osman

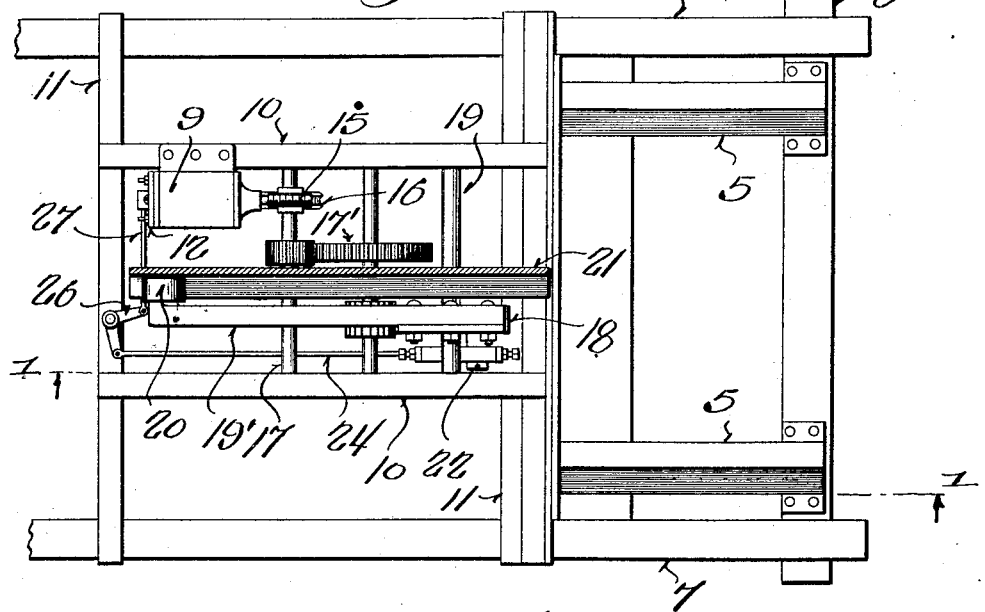
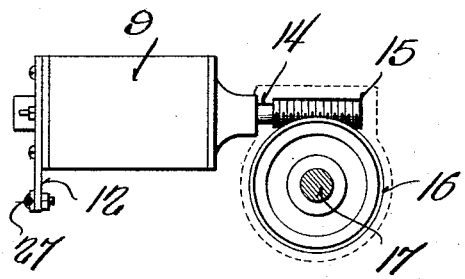

Patented Dec. 9, 1930

1,784,464

UNITED STATES PATENT OFFICE

RALPH T. OSMAN, OF MANSFIELD, OHIO

VEHICLE DUMP BODY

Application filed November 8, 1928. Serial No. 317,963.

This invention pertains to improvements in vehicle dump bodies and more particularly to the mechanism for effecting the dumping operation.

Heretofore, various mechanical and electrical power devices have been provided for tilting one end of a dump body to discharge the contents, and while these have accomplished their purpose, in certain types of structures, they are in all instances costly and complicated.

The mechanical devices, in general, are operated by the engine, which requires special construction to provide the necessary drive and controls. The electrical devices are impractical when driven off the storage battery due to the great amount of current required, and where a motor driven generator is provided, the cost is prohibitive.

It is, therefore, the primary object of the present invention to overcome the foregoing objections by the provision of an exceedingly simple, inexpensive, and efficient electrically operated hoisting apparatus, which requires a minimum amount of current and can, therefore, be operated by the conventional starting motor which causes little drain upon the battery.

Incidental to the foregoing, it is an object of the present invention to provide a combination gravity dump body and electrically operated tilting mechanism whereby minimum power is required to either tilt or lower the body.

A more specific object is to improve the mounting between the body and vehicle whereby the body is held rigidly against lateral movement upon its tracks, regardless of wear, and whereby the tracks are self-cleaning to prevent the accumulation of material with resulting impedance in the tilting operation.

A further object is to provide a gravity dump body with means to retard its momentum during the tilting operation to prevent overthrow and strain upon the actuating mechanism and at the same time to raise the discharge end of the body to give greater clearance over the vehicle wheels when the same is in dumping position.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is a longitudinal section illustrating the dump body and the actuating mechanism constructed in accordance with the present invention, the same being taken on the line 1—1 of Figure 3;

Figure 3 is a plan section taken on the line 3—3 of Figure 1;

Figure 4 is a detailed view illustrating the motor drive; and

Figure 5 is a detail of the motor direction control, the electric circuit being shown diagrammatically.

Figure 1:
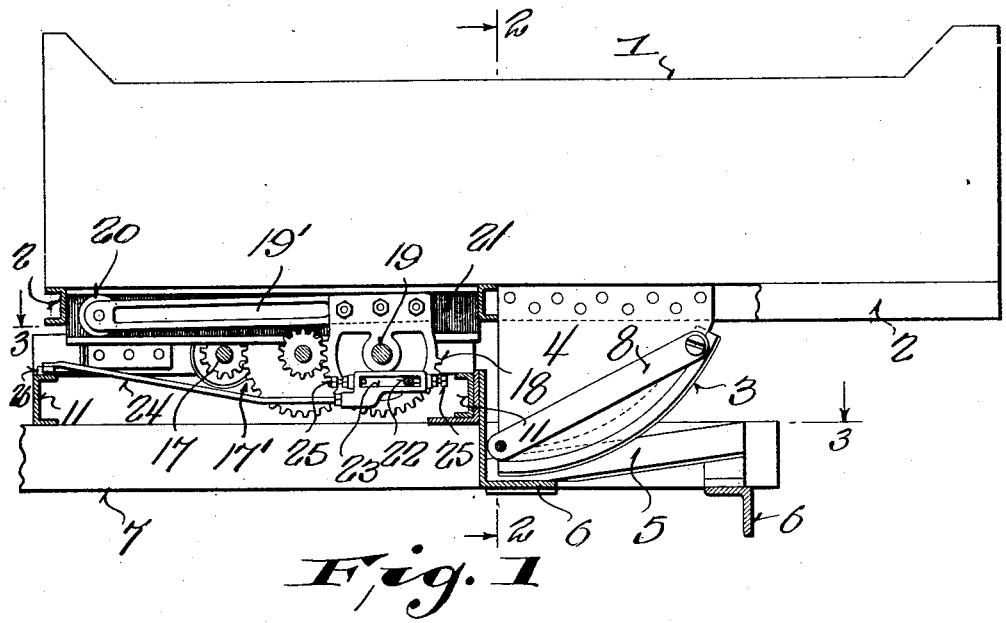

Referring now more particularly to the accompanying drawings, the numeral 1 designates a conventional type of dump body mounted upon the usual transverse and longitudinal reenforcing sills 2. In accordance with the foregoing objects, one of the essential features of the present invention resides in the provision of a dump body requiring little effort to actuate the same, thus permitting the use of a small electric motor requiring a minimum current to effect the tilting operation. To accomplish this, it is proposed to use a gravity type of dump body wherein the center of gravity of the body and its contents is positioned closely adjacent the fulcrum point of the body.

In the present instance, the body illustrated is of the rocker type and comprises the arcuate rockers 3 secured to the sills 2 of the body by means of the plates 4, which are preferably welded to the rockers along their arcuate edges. The rockers 3 engage the tracks 5 carried upon suitable cross members 6 secured to the longitudinal vehicle frame members 7.

Figure 2:
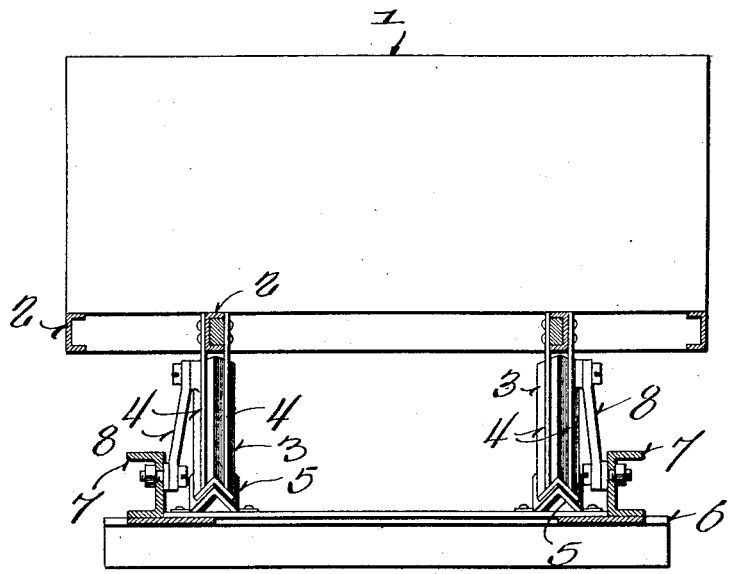
Figure 2 is a transverse section taken on the line 2—2 of Figure 1.

As best illustrated in Figure 2, both the rockers 3 and the tracks 5 are formed of angle iron, the corners of the track irons serving as an apex to engage the inner angles of the rockers 3. Thus, it will be readily seen that the rockers will adjust themselves to the tracks regardless of any clearance resulting in manufacture or through wear. It will also be appreciated that the present structure of track is self-cleaning, as the rockers will readily force any material from the sides, thus preventing the accumulation of dirt or material on the track, which is a common occurrence in instances where flat tracks are employed.

As best shown in Figure 1, the tracks 5 are inclined upwardly towards their rear ends. Thus, as the body is tilted rearwardly on its rockers and the center of gravity moves rearwardly, the entire body will rise, causing the momentum to be retarded, which relieves strain upon the actuating mechanism and prevents tendency of the body to overthrow. The links 8 pivoted at their lower ends to the longitudinal frame members 7, and at their upper ends to the track carrying plates 4, serve to prevent longitudinal shifting of the body on the tracks.

From the foregoing, it will be quite obvious that the type of dump body employed can be so designed as to require a minimum amount of power to effect the tilting operation. For this purpose, a conventional type of engine starting motor 9 is provided, the same being mounted in any suitable manner upon an auxiliary framework 10 carried by cross members 11 secured to the longitudinal vehicle frame members 7. Current may be supplied to the motor 9 through the usual storage battery B of the motor vehicle upon which the body is mounted, while a control switch S, positioned in any convenient place for the operator, controls the motor circuit C.

For the purpose of controlling the direction of drive of the motor 9, a plate 12, which carries the brushes 13, is pivotally mounted upon one end of the motor. As the plate 12 is oscillated in a manner hereinafter described, the brushes are shifted to reverse the direction of current in the armature in the conventional manner.

The motor shaft 14 is provided with a worm 15 which engages the worm wheel 16 mounted on the transverse shaft 17, carried by the auxiliary frames 10, as indicated in dotted lines in Figure 4. The motor worm drive may be enclosed in a suitable casing which is not shown in the drawings for the purpose of simplifying the illustration.

Through a suitable gear train 17' power is transmitted to the sector 18 mounted on the transverse shaft 19, also carried by the auxiliary frames 10. Secured to the sector 18 is an arm 19' which carries a roller 20 engaging a channel track 21 secured to the bottom of the body 1, longitudinally and centrally of the same. Thus, as movement is transmitted to the sector 18, the arm 19' will be caused to rock upwardly, raising the rear end of the body and causing the same to rock upon the tracks 5. Obviously, very little power is required for this operation, and this is further minimized by the reduction gearing between the motor and the sector. It will also be seen that as the body is tilted, the same may be stopped and held in any position by merely opening the switch S, as the worm drive between the motor and the shaft 17 is practically interlocking.

In order to prevent overthrow of the body, through inadvertence of the operator, it is proposed to provide automatic means for controlling the reversing of the motor at the limit of the tilting operation. While this may be accomplished in various ways, one simple form is disclosed, wherein a pin 22 carried by the sector 18 engages in a slot 23 provided in the lever 24. Set screws 25, positioned at opposite ends of the slot 23 serve to regulate the actuation of the lever 24 as the sector is rotated, and the pin 22 travels back and forth in the slot.

The opposite end of the lever 24 is connected to a bell crank 26 which in turn is connected with the oscillating plate 12 through the link 27. Thus, as the sector is oscillated, the pin 22 is free to travel in the slot 23 during its intermediate movement, and as the body approaches the limits of its movement, the pin will engage the set screws 25 to reciprocate the lever 24 and, through the connection described, oscillate the plate 12 to stop the motor.

From the foregoing, it will be obvious that a comparatively simple, inexpensive, and efficient dumping apparatus has been provided, which requires a minimum amount of current and can, therefore, be repeatedly actuated without prohibitive drain upon the conventional battery of the motor vehicle.

It will also be appreciated that the present invention may be designed as a separate unit and applied to any conventional type of vehicle without altering its construction and provide auxiliary driving connections with the motor vehicle engine. Furthermore, the advantage of an electrically operated hoist will be quite apparent in that the same may be easily controlled by the manipulation of a simple switch within convenient reach of the vehicle driver.

Another material advantage of the present structure resides in the mounting of the body upon the vehicle frame whereby the same is held rigidly against lateral shifting, regardless of clearance between the tracks and rockers, and in which undue jars and strain upon the actuating mechanism is avoided, and desired clearance is obtained as the body is raised during tilting.

I claim:

A device of the class described comprising a fulcrumed body, a vehicle frame, inverted V-shaped inclined tracks carried by said frame and arcuate inverted V-shaped rockers carried by said body and engaging said tracks to mount said body upon the frame for tilting movement.

In testimony that I claim the foregoing I have hereunto set my hand at Mansfield, in the county of Richland and State of Ohio.

RALPH T. OSMAN.